(No Model.) 2 Sheets—Sheet 1.
G. H. WILLIAMS.
CAR DUMPING APPARATUS.

No. 557,742. Patented Apr. 7, 1896.

Witnesses.
E. B. Gilchrist
[signature]

Inventor,
Gurdon H. Williams
By M. D. Leggett
his attorney.

(No Model.) 2 Sheets—Sheet 2.

G. H. WILLIAMS.
CAR DUMPING APPARATUS.

No. 557,742. Patented Apr. 7, 1896.

Witnesses
E. B. Gilchrist

Inventor.
Gurdon H. Williams
By M. D. Leggett & Co.
his Attorneys

UNITED STATES PATENT OFFICE.

GURDON H. WILLIAMS, OF CLEVELAND, OHIO.

CAR-DUMPING APPARATUS.

SPECIFICATION forming part of Letters Patent No. 557,742, dated April 7, 1896.

Application filed July 18, 1894. Serial No. 517,862. (No model.)

*To all whom it may concern:*

Be it known that I, GURDON H. WILLIAMS, of Cleveland, in the county of Cuyahoga and State of Ohio, have invented certain new and useful Improvements in Car-Dumping Apparatus; and I do hereby declare the following to be a full, clear, and exact description of the invention, such as will enable others skilled in the art to which it pertains to make and use the same.

My invention relates to improvements in car-dumping apparatus; and it consists in certain features of construction and in combinations of parts hereinafter described, and pointed out in the claims.

A preferable construction of apparatus embodying my invention is shown in the accompanying drawings, wherein—

Figure 1:
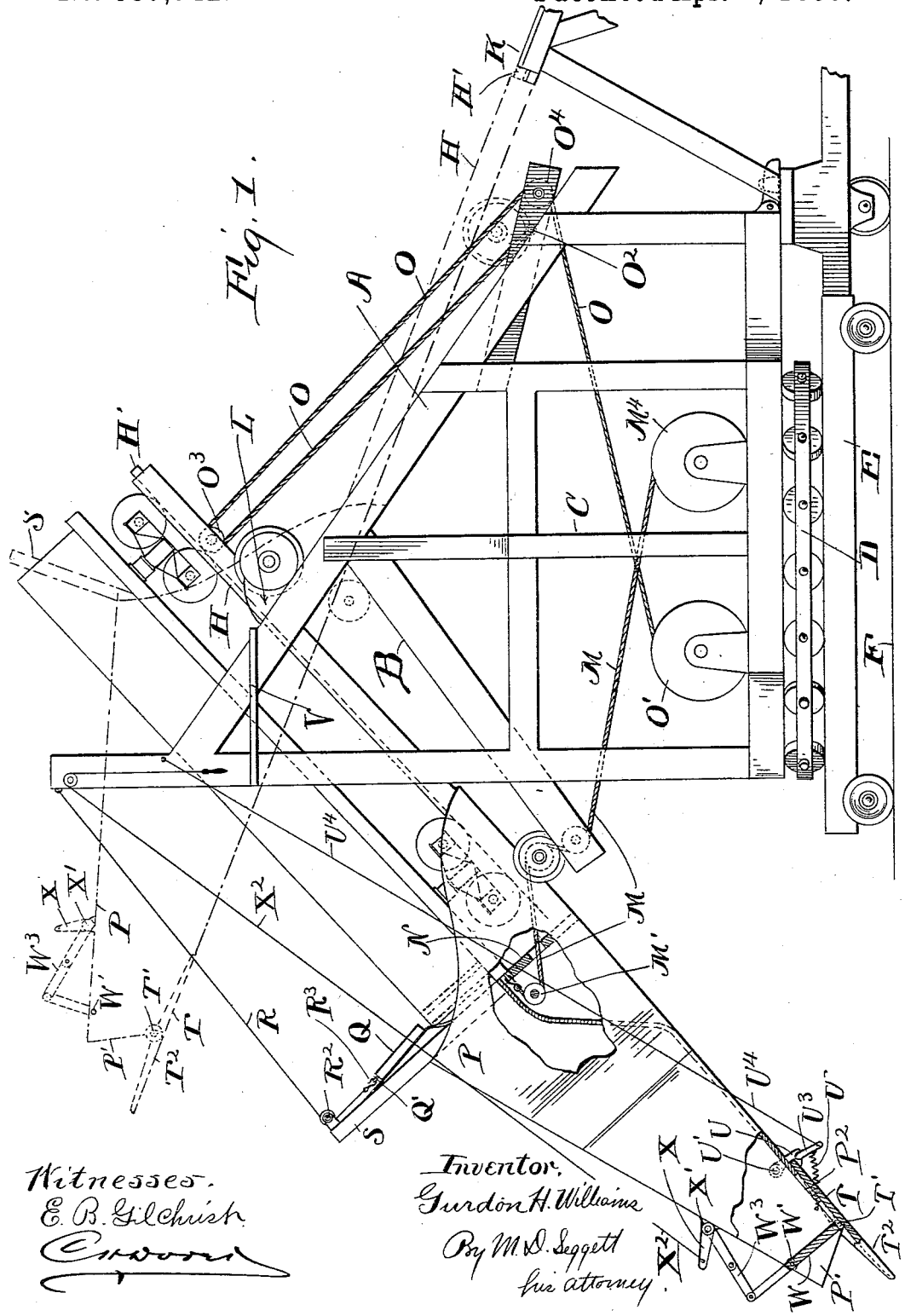
Figure 2:
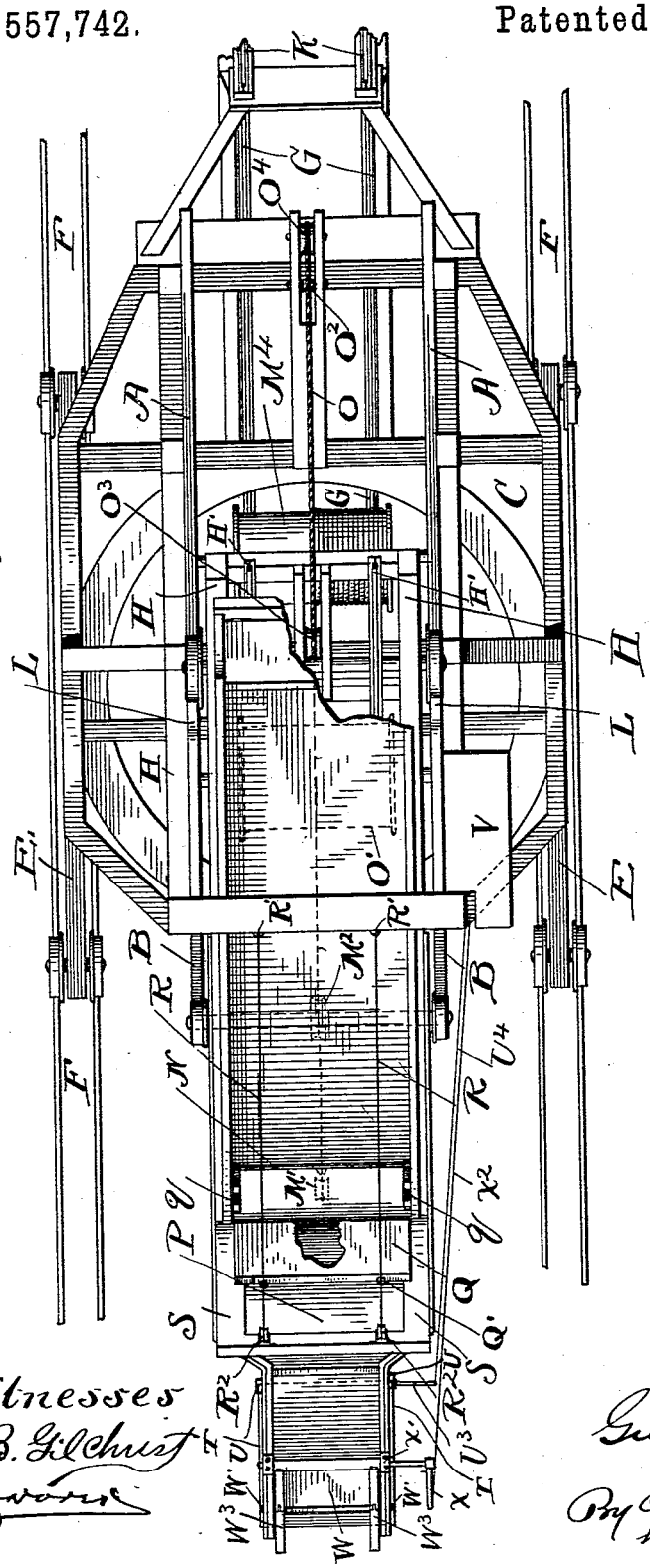

Figure 1 is a side elevation of the same, partly in section, portions being broken away to more clearly show the construction and to reduce the size of the figure. Fig. 2 is a top plan of the same with portions broken away to more clearly show the construction.

My improved dumping apparatus comprises two inclined tracks A and B, respectively, the trend whereof is upwardly and toward each other. Said inclined tracks are supported in any approved manner, preferably by a frame structure C, that is mounted upon a turntable D, which in turn is carried by a wheeled platform E, the wheels whereof engage a track F.

A wheeled platform H is mounted upon inclined tracks A and B, the wheels at one end of said platform engaging track A and the wheels at the other end of the platform engaging track B. Platform H is provided with a track H' that has the same gage as railway-track G, track F being arranged parallel with track G, but the latter being located between the rails of track F. Track H' on platform H is adapted to receive the railway-car to be dumped. My improved dumping apparatus is more especially designed for use in loading vessels at docks or wharves, and hence it is desirable to elevate the car to be dumped the distance required above the level of the dock or wharf.

My improved apparatus at the car-receiving end of the same is provided with an inclined track K, that is arranged in line with railway-track G and track H' on platform H, said track K extending from track G upwardly in the direction of inclined track A, and is adapted to receive the car to be dumped from track G. The upper end of track K is located somewhat above the lower end of track A, and the dumping-platform H, when in position to receive the car from track K, is in position with the track thereof in the same inclined plane as track K, in which position (shown in dotted lines, Fig. 1) the wheels at the receiving end of said platform engage the lower portion of track A and the wheels at the opposite end of the platform engage the upper portion of track B.

The car to be dumped having been run upon the dumping-platform the latter is actuated in the direction of the place of dumping, during which movement of the dumping-platform the wheels at the outer end of said platform descend track B and the wheels at or near the receiving end of the platform ascend track A, resulting in the tilting of the platform to the position shown in solid lines, Fig. 1, in which position the platform and the car upon it decline in the direction of the place of dumping and in which position the contents of the car will be dumped or discharged, as required, upon elevating or removing the end-gate at the discharging end of the car.

The rails of track A extend, preferably, somewhat above the upper end of track B, and at their upper extremities are provided stops L, adapted to be engaged by the wheels at the receiving end of platform H when the latter has been actuated to the extreme of its declining position—that is, said stops are adapted to limit the actuation of the platform in the direction of dumping. The means employed for actuating said platform from the position shown in dotted lines, Fig. 1, in which it is adapted to receive the car to be dumped from track K to the position shown in solid lines, same figure, in which the car upon the platform is in position to dump its load or contents, is preferably as follows: A rope or cable M is hitched to the discharging end of the car to be dumped, and thence leads to and over a sheave or pulley M', suitably supported from the dumping-platform near the stop N, with which said platform is provided, and that is adapted to be engaged by the end sill of the car at the discharging end of the latter when the car is in position to discharge or dump its contents. From sheave or pulley M' rope or cable M leads to and over a sheave or pulley M² on the adjacent axle of the dumping-platform, thence leads to and over a sheave or pulley M³, suitably supported from structure C, and thence to and over winding-drum M⁴, that is located upon structure C, and is operated in any approved manner. By turning said drum in the direction to wind up rope or cable M the dumping-platform is actuated in the direction indicated.

For actuating the dumping-platform in the opposite direction—that is, from the position in which the car thereon is adapted to discharge or dump its contents to the position wherein track H' on the platform is in line with track K—a rope or cable O and a winding-drum O' are preferably provided, said rope or cable being attached at one end, as at O², to structure C, thence leading to and over a sheave or pulley O³ carried by and at or near the receiving end of platform H, thence to and over a sheave or pulley O⁴, supported from structure C and preferably in close proximity to point O², and thence leading to and over the winding-drum to which it is attached, said winding-drum being actuated in any approved manner.

The dumping-platform, at its outer end, is provided with a hopper P, into which the contents of the laden car are discharged or dumped, said hopper being adapted to discharge into the hatchway of the vessel or at any other point desired. The sides of the hopper are adapted to somewhat overlap the sides of the car to be dumped when the car is in a dumping position, and the hopper has such length that when the dumping-platform is in a dumping position the discharging end of the hopper shall extend into suitable proximity to the hatchway or place to which the load is to be conveyed.

The end-gate Q of the car at the discharging end of the car is adapted to slidably operate in pockets q, formed in the sides of the car, and is adapted to be elevated out of said pockets in order to enable the car to dump or discharge its load. Suitable means are provided for automatically elevating or removing said end-gate of the car when the latter is in position to dump, the means employed consisting, preferably, of one or more ropes or cables R, attached at one end, as at R', to the top or upper end of structure C, and thence leading to and over a sheave or sheaves R², supported from a frame S, that is rigid with platform H and hopper P, whence ropes or cables R lead to and are adapted to have their other ends attached to the end-gate of the car, the end-gate-engaging ends of said ropes or cables terminating, preferably, in hooks R³ for engagement with eyes Q' secured to the top of the end-gate. Ropes or cables R are, of course, slack when the dumping-platform is in position with its track H' in line with track A, and the length of said ropes or cables is such that when the dumping-platform and the car thereon have been actuated into a dumping position the end-gate at the discharging end of the car shall have been elevated or removed to enable the car to discharge its contents.

The construction of the discharging end of hopper P is preferably such that said hopper is capable of discharging into one or the other side of the hatchway of a vessel. To this end said hopper has two discharging-openings, the one opening, P', being adapted to discharge into one side of the hatchway of a vessel and the other opening, P², being adapted to discharge into the opposite side of said hatchway. A gate T is pivotally supported from the hopper, as at T', between the two discharging-openings P' P², and is adapted to close opening P². Gate T is held in position closing opening P² by means of one or more catches U, preferably a pair of said catches, located at opposite sides of hopper P, respectively, and pivoted to the hopper, as at U'. One or more springs U², that are suitably secured to the hopper, act in the direction to retain said catches in their locking position. The two catches shown are connected by a bar or rod U³, and a rope or cable U⁴, attached to said bar or rod, leads thence to within suitable reach from the operator's stand V.

For closing discharge-opening P' of the hopper there is provided a gate W, that is pivotally secured to the hopper, as at W', and is operatively connected, by means of toggle-arms W³, with a lever X, that is fulcrumed, as at X', to the hopper, and has attached a rope or cable X², that leads thence to within convenient reach from the operator's stand, the arrangement of parts being such that when said gate W is in its closed position the toggle-arms are straightened, as shown in Fig. 1, and thereby retain the gate in its closed position, and when said toggle-arms are tripped or actuated laterally out of line by actuating the operating rope or cable in the direction required the discharged load or contents of the car will push said gate outwardly, as required, to open or free the discharging-opening P' and thereby enable the dumped load to pass through said discharging-opening.

Gate T is provided with an apron T², that in the operative position of the gate forms an extension of the bottom of the hopper, so that when the load is discharged through opening P' it will be carried some distance from the point at which it would be delivered if the same were discharged at opening P².

What I claim is—

1. The combination of the two elevated inclined tracks A and B, a wheeled platform H and its track H', inclined track K having the same gage as track H', all arranged and operating substantially as indicated, a stop adapted to be engaged by the delivering end of the car when the latter is in position for dumping, another stop for limiting the actuation of the aforesaid platform in the direction of dumping, and suitable means for actuating said platform in opposite directions, substantially as set forth.

2. A car-dumping apparatus comprising two inclined tracks A and B and dumping-platform H mounted upon both of said tracks, all arranged substantially as indicated, the dumping-platform being provided with a track H' for receiving the laden car and having a stop N adapted to be engaged by the delivering end of the car when the latter is in position for dumping, means for actuating the dumping-platform in opposite directions, a hopper P rigid with the platform and having two discharge-openings P' P², gates for closing said openings and suitable means for actuating said gates to open, substantially as shown, for the purpose specified.

3. A car-dumping apparatus comprising two elevated inclined tracks A and B arranged substantially as indicated, a wheeled platform H mounted upon both of said tracks and being provided with track H' for the reception of the laden car and a stop adapted to be engaged by the delivering end of the car when the latter is in position for dumping, suitable means for actuating the aforesaid platform in opposite directions, a rope or cable R attached, at one end, as at R', to a stationary object, thence leading to and over a sheave R² carried by the dumping-platform and adapted, at its opposite end, to be attached to the end-gate at the delivering end of the car, substantially as shown, for the purpose specified.

4. A dumping apparatus comprising two inclined tracks A and B, arranged substantially as indicated, wheeled platform H mounted upon both of said tracks and bearing a track H' for receiving the laden car, means for actuating said platform in opposite directions, a stop N and hopper P rigid with the platform, said hopper having a discharge-opening P', gate W, toggle-arms W³, lever X, and rope or cable X², all arranged and operating substantially as shown, for the purpose specified.

5. A dumping apparatus comprising two inclined tracks A and B, arranged substantially as indicated, wheeled platform H mounted upon both of said tracks and bearing a track H' for receiving the laden car, means for actuating said platform in opposite directions, a stop N and hopper P rigid with the platform, said hopper having a discharge-opening P², gate T terminating in an apron T², spring-actuated catch or catches U, and suitable means for actuating said catch or catches in the direction to unlock, all arranged substantially as shown, for the purpose specified.

6. A dumping apparatus comprising two inclined tracks A and B arranged substantially as indicated, wheeled platform H mounted upon both of said tracks and bearing a track H' for receiving the laden car, means for actuating said platform in opposite directions, a stop N and hopper P rigid with the platform, said hopper having two discharge-openings P' and P², gates W and T, and means for opening said gates, all arranged substantially as shown, for the purpose specified.

In testimony whereof I sign this specification, in the presence of two witnesses, this 27th day of January, 1894.

GURDON H. WILLIAMS.

Witnesses:
C. H. DORER,
WARD HOOVER.